July 30, 1957  J. V. COLBY  2,801,124
LITTER
Filed May 31, 1956
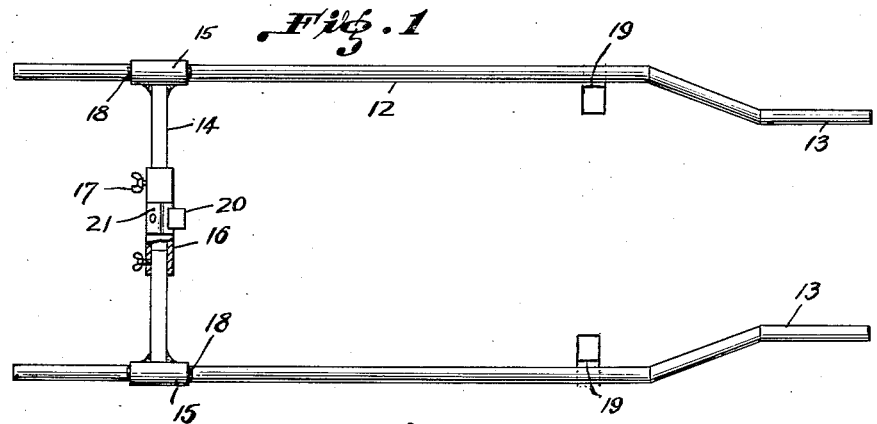
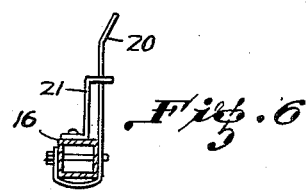
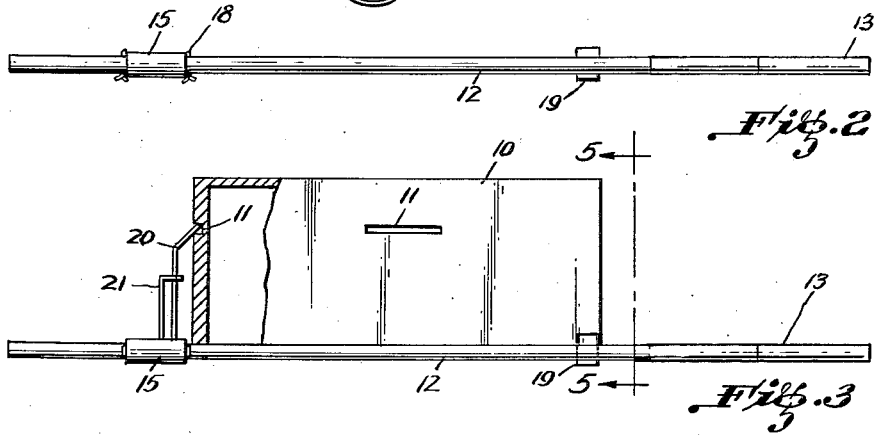
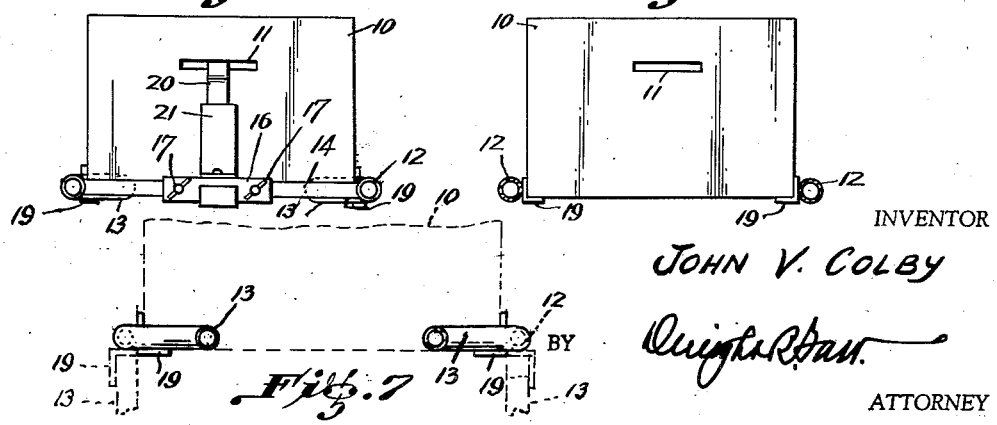
INVENTOR
JOHN V. COLBY
BY
ATTORNEY United States Patent Office 2,801,124
Patented July 30, 1957

2,801,124
LITTER
John V. Colby, Bard, Calif.
Application May 31, 1956, Serial No. 588,281
4 Claims. (Cl. 294—15)

This invention is a litter adapted for lifting, carrying and moving objects such as bee hives.

The primary object of the invention is to provide a litter of such character that it may be easily and quickly applied to a bee hive to permit the latter being lifted, loaded or moved with care and with as little disturbance as possible and which may with equal facility be removed when the destination of the hive has been reached.

A further object of the invention is to provide a litter of the character mentioned which is of extremely simple construction and which is equipped with means for automatically clamping the hive securely to the litter when lifting pressure is applied to the same.

A still further object of the invention is to provide a bee hive litter which may be manufactured and marketed at low cost, which has but few simple and readily assembled parts, which parts are so constructed and arranged as to minimize the opportunity for wear, breakage or derangement, and which will prove highly effective in carrying out its purposes.

With the foregoing objects in view, together with others which will appear as the description proceeds, the invention resides in the novel construction, combination and arrangement of parts, all as will be more particularly described hereinafter, illustrated in the drawings, and particularly pointed out in the claims.

In the drawing:

Fig. 1 is a top plan view of the bee hive litter constructed in accordance with the invention and showing the parts in the position they will assume applied to the hive, Fig. 2 is a side elevation of the litter as shown in Fig. 1, Fig. 3 is a view similar to Fig. 2 showing the litter applied to the hive and with the parts in the position they will assume in lifting and transporting the hive, Fig. 4 is a front elevation of the device as shown in Fig. 3, Fig. 5 is a sectional view taken substantially on line 5—5 of Fig. 3 and looking in the direction indicated by the arrows, Fig. 6 is an enlarged fragmentary sectional view taken through the connecting stay and showing means for supporting the hive at one end, and Fig. 7 is an end view of the improved litter showing in full lines the position assumed by the handles during the carrying operation with the dotted line position showing the position the handles will assume in releasing the hive.

Referring now more particularly to the drawing, the hive is indicated generally at 10 and includes the usual rectangular box-like structure usually provided in its sides or ends with recesses 11 to provide hand holds. In some instances, these hand holds may be separate elements attached to the exterior of the hive as will be understood.

The litter of my construction comprises a pair of straight tubes or shafts 12 formed of light steel, aluminum or other metal, each being bent or deflected laterally at one end to provide handle portions 13.

Interposed transversely between and connecting the shafts 12 near their opposite ends is a stay indicated generally at 14. This stay is similarly formed of hollow metal and is preferably of rectangular cross section as shown, the stay comprising sections equipped at their outer ends with sleeves 15 to rotatably receive the shafts 12. The inner ends of these sections are connected by a collar 16, which collar is of rectangular cross section and of a size to snugly accommodate the sections of the stay. Set screws 17 threaded through the collar 16 engage and securing hold the stay sections rigidly with the collar. By this means, the lateral spacing of the shafts 12 may be accurately fixed. Keys 18 are passed through the shafts 12 at the opposite ends of the sleeves 15 to hold the shafts against sliding movement within the sleeves.

Each shaft 12 is provided adjacent the handle end 13 but inwardly thereof with a supporting lug 19. These lugs may be welded or in any other desired manner firmly affixed to their respective shafts and are disposed in a plane at substantially right angles to the plane of its respective handle portion. From this arrangement it is apparent that when the handles are in lowered position, that is, when extending downwardly with respect to the shafts 12 with which they are associated, the lugs 19 will project downwardly of the shafts, but upon rotating the shafts 90 degrees or with the handles in upward position, the lugs 19 will have moved to a position inwardly of the shafts or projecting toward one another.

The collar 16 connecting the strut sections is provided with an upwardly extending pawl or dog 20 to engage at its upper end in or beneath a hand hole 11 at the adjacent end of the hive to support the same, and this lug is normally urged in the direction of the hive by a spring of any desired style or type 21 to insure proper locking engagement of the dog with the hand hole.

It will be understood that the distance between the location of the dog 20 and the lugs 19 is such as to be within the lines of the hive.

In applying the litter to the hive for lifting or moving purposes, the shafts 12 will have been adjusted in spaced relationship a distance sufficient to enable them to clear the sides of the hive, whereupon they are lowered until the shafts 12 are substantially aligned with the lower end or bottom of the hive. With the dog 20 engaged with the hand hold 11, lifting action is applied to the handles 13, it being understood that another operator will grasp the opposite ends of the shafts at the same time. As lifting action is applied to the offset handles, the shafts will rotate to the upward position as shown in Fig. 3 and in the full line position shown in Fig. 7, whereupon the lugs 19 will have been moved so as to project beneath the edges of the hive and in supporting engagement therewith. When thus supported, the hive may be moved to its desired destination, after which it is lowered and as soon as it comes to rest upon its support relaxing of the grip upon the handles will allow the shafts to rotate to such position that the supporting lugs 19 will have been moved from beneath the hive, whereupon the litter may be removed.

It is obvious from this arrangement that the lifting action applied to the offset handles 13 brings about a proper positioning of the lugs 19 to adequately support the hive and the weight of the latter assists in maintaining the lugs so positioned. The supporting dog 20 is of conventional form as will be understood, and may if desired itself be made of spring metal. In other instances, the spring 21, which may take any desired form, may be utilized to insure proper seating of the dog in engagement with the hand hold during the carrying operation.

I claim:

1. A litter to carry a box-like structure having spaced parallel sides, comprising a pair of shafts one disposed longitudinally along each side of said structure and parallel with the bottom edge thereof, a stay disposed between said shafts beyond one end of said structure, sleeves at the ends of said stay to rotatably receive said shafts, means whereby said stay may be varied in length, lugs secured to and projecting from said shafts near the opposite ends thereof and of such length as to move beneath and support said structure sides when said shafts are rotated, offset handle portions on said shafts projecting inwardly therefrom, and means on said stay for supporting the opposite end of said structure.

2. A litter to support a box-like structure having parallel sides, comprising a pair of spaced parallel shafts disposed one along each side of said structure near the bottom thereof, inwardly offset handle portions at the outer ends of said shafts, a lug secured to and projecting outwardly from each shaft disposed in a plane substantially at right angles with its handle portion whereby to underlie and support said structure sides when the handles are rotated 90 degrees, a stay rotatably connecting said shafts near the opposite ends, and a supporting member on said stay to engage and support the adjacent end of said structure.

3. A litter to carry a box-like structure having parallel sides, comprising a pair of spaced parallel shafts one disposed longitudinally along each side and near the bottom thereof, a stay disposed transversely between and rotatably supporting said shafts near one end thereof and near one end of said structure, an inwardly offset handle portion at the opposite end of each shaft, a lug secured to each shaft inwardly of the handle end thereof and projecting inwardly of the shaft in a plane at substantially right angles to the plane of the handle portion, and a supporting member on said stay to engage and support the adjacent end of said structure.

4. A litter to carry a box-like structure having spaced parallel sides, comprising a pair of rotatable shafts one along each side of said structure at the bottom thereof and parallel therewith, a stay disposed transversely between said shafts beyond one end of said structure, sleeves at the ends of said stay rotatably receiving said shafts, lugs secured to and projecting at substantially right angles from said shafts near the opposite ends thereof and of such length as to move beneath the sides of said structure when said shafts are rotated, offset handle portions integral with said shafts which when moved in one direction causes said shafts to rotate to move said lugs beneath and in supporting engagement with said structure, and means on said stay for supporting the opposite end of the structure.

No references cited.